US012665983B2

(12) United States Patent
Jeon et al.

(10) Patent No.: US 12,665,983 B2
(45) Date of Patent: Jun. 23, 2026

(54) METHOD FOR DETERMINING HEAT AND REFLECTED HEAT IN THERMAL IMAGE

(71) Applicants: KOREA HYDRO & NUCLEAR POWER CO., LTD, Gyeongju-si (KR); ATG CO., LTD., Seongnam-si (KR); INHA UNIVERSITY RESEARCH AND BUSINESS FOUNDATION, Incheon (KR)

(72) Inventors: I Seul Jeon, Daejeon (KR); Sung Mok Min, Gyeongju-si (KR); Song Hae Ye, Daejeon (KR); Won Kyu Lee, Sejong (KR); Ju Sik Kim, Daejeon (KR); Hee In Lee, Gyeongju-si (KR); Dong Heon Choi, Yongin-si (KR); Jang Woo Kwon, Busan (KR); Seon Woo Lee, Seoul (KR)

(73) Assignees: KOREA HYDRO & NUCLEAR POWER CO., LTD, Gyeongju-si (KR); ATG CO., LTD., Seongnam-si (KR); INHA UNIVERSITY RESEARCH AND BUSINESS FOUNDATION, Incheon (KR)

(*) Notice: Subject to any disclaimer, the term of this patent is extended or adjusted under 35 U.S.C. 154(b) by 184 days.

(21) Appl. No.: 18/578,933

(22) PCT Filed: Nov. 30, 2021

(86) PCT No.: PCT/KR2021/017882
§ 371 (c)(1),
(2) Date: Jan. 12, 2024

(87) PCT Pub. No.: WO2023/286941
PCT Pub. Date: Jan. 19, 2023

(65) Prior Publication Data
US 2024/0314266 A1 Sep. 19, 2024

(30) Foreign Application Priority Data

Jul. 15, 2021 (KR) ........................ 10-2021-0092826

(51) Int. Cl.
*H04N 5/33* (2023.01)
*G01J 5/02* (2022.01)
(Continued)

(52) U.S. Cl.
CPC ................ *H04N 5/33* (2013.01); *G01J 5/025* (2013.01); *G06F 18/23* (2023.01); *G06N 3/08* (2013.01);
(Continued)

(58) Field of Classification Search
CPC .............. H04N 5/33; G06T 7/11; G06F 18/23
See application file for complete search history.

(56) References Cited

U.S. PATENT DOCUMENTS 9,066,028 B1 6/2015 Koshti
2014/0125815 A1* 5/2014 Holz ..................... H04N 23/81
348/169
(Continued)

FOREIGN PATENT DOCUMENTS

JP 2002-502968 A 1/2002
JP 4534700 B2 9/2010
(Continued)

OTHER PUBLICATIONS

The Extended European Search Report for European Patent Application No. 21950283.8, dated Jun. 3, 2025.
(Continued)

*Primary Examiner* — Hugh Maupin

(57) ABSTRACT

A method for determining heat and reflected heat in a thermal image, according to the present invention, comprises the steps of: a) photographing a subject through a
(Continued)

10 thermal imaging camera   data collector   data analyzer   detector   display 100   300   500   700   900 thermal imaging camera so as to collect a thermal image of the subject; b) analyzing features according to the thermal image temperature distribution of the thermal image; c) detecting the heat and the reflected heat in the thermal image according to the analysis in step b); and d) displaying, as heat and reflected heat regions in the thermal image, the heat and the reflected heat in the thermal image detected in step c).

5 Claims, 5 Drawing Sheets

(51) Int. Cl.
| | | |
|---|---|---|
| *G06F 18/23* | (2023.01) | |
| *G06N 3/08* | (2023.01) | |
| *G06T 7/11* | (2017.01) | |
| *G01J 5/00* | (2022.01) | |

(52) U.S. Cl.
CPC ......... *G06T 7/11* (2017.01); *G01J 2005/0077* (2013.01); *G06T 2207/10048* (2013.01); *G06T 2207/20081* (2013.01)

(56) References Cited

U.S. PATENT DOCUMENTS

| | | | | |
|---|---|---|---|---|
| 2015/0339830 | A1* | 11/2015 | Heissenstein | G01N 25/72 |
| | | | | 348/90 |
| 2016/0252399 | A1* | 9/2016 | Sun | G01N 25/18 |
| | | | | 702/135 |
| 2016/0284075 | A1* | 9/2016 | Phan | G06T 7/001 |
| 2017/0011503 | A1* | 1/2017 | Newman | G01N 25/72 |
| 2020/0054905 | A1 | 2/2020 | Livchak et al. | |
| 2020/0074616 | A1 | 3/2020 | Al Shehri et al. | |
| 2020/0348183 | A1* | 11/2020 | Agarwal | G01J 5/12 |
| 2021/0018426 | A1* | 1/2021 | Amer | G01N 17/04 |
| 2021/0201074 | A1* | 7/2021 | Reinpoldt | G06T 7/20 |
| 2022/0122638 | A1* | 4/2022 | Hay | G06F 3/005 |

FOREIGN PATENT DOCUMENTS

| | | | |
|---|---|---|---|
| JP | 2013-145153 | A | 7/2013 |
| JP | 2019-22251 | A | 2/2019 |
| JP | 2020-148414 | A | 9/2020 |
| KR | 10-2019-0077688 | A | 7/2019 |
| KR | 10-2020-0142147 | A | 12/2020 |
| KR | 10-2219598 | B1 | 2/2021 |
| KR | 10-2242477 | B1 | 4/2021 |

OTHER PUBLICATIONS

Baohong Mi et al, "Evaluation method of infrared thermography on children with idiopathic thrombocytopenia purpura: Preliminary," Infrared Physics and Technology, Sep. 6, 2019, vol. 102.

* cited by examiner

METHOD FOR DETERMINING HEAT AND REFLECTED HEAT IN THERMAL IMAGE

CROSS-REFERENCE TO RELATED APPLICATIONS

This application is the National Stage filing under 35 U.S.C. 371 of International Application No. PCT/KR2021/017882, filed on Nov. 30, 2021, which claims the benefit of Korean Patent Application No. 10-2021-0092826, filed on Jul. 15, 2021, the contents of which are all hereby incorporated by reference herein in their entirety.

TECHNICAL FIELD

The disclosure relates to a method of determining heat and reflected heat in a thermal image, and more particularly to a method of determining heat and reflected heat in a thermal image, in which a subject is photographed to collect a thermal image, and the heat and the reflected heat in the thermal image are analyzed by artificial intelligence.

BACKGROUND ART

A thermal power plant refers to a power generation system that uses fossil fuels such as coal to generate thermal energy and supplies steam generated by the thermal energy to a turbine to generate electricity. A nuclear power plant refers to a power generation system that uses a nuclear reaction of nuclear fuels to generate thermal energy and supplies steam generated by the thermal energy to a turbine to generate electricity.

In the thermal power plant and the nuclear power plant, the thermal energy is used to generate the steam to be supplied to the turbine, and thus the effects of the thermal energy, such as a thermal shock, occurs in the facilities, the pipework through which hot fluid flows, etc. of each power plant. For example, the nuclear power plant basically includes a nuclear reactor in which a nuclear reaction occurs, and a steam generator in which the steam is generated by the flow of a hot primary coolant provided from the nuclear reactor, and further includes circulation pipework to circulate the primary coolant between the nuclear reactor and the steam generator.

Meanwhile, the facilities of the power plant, which uses the thermal energy to generate the steam, are required to be continuously monitored to prevent damage and quickly manage failures due to abnormal conditions such as the thermal shock caused by the thermal energy to the facilities and pipework as described above. For example, the monitoring is performed by collecting the thermal images of the facilities, pipework, etc. of each power plant, and tracking high and low temperatures to analyze thermal states. In other words, diagnostic evaluation is performed based on temperature values in the thermal images of the facilities, pipework, etc. of each power plant, and the analysis of the thermal images is performed by a thermal image analyst.

However, the foregoing method of collecting the thermal images of the facilities, pipework, etc. of each power plant and tracking the high and low temperatures to obtain the temperature values has a problem of increasing time taken in the diagnostic evaluation of a diagnostic target. In addition, the diagnostic evaluation based on the temperature values obtained by tracking the high and low temperatures of the thermal image is performed without accurately determining the effects of actual heat and reflected heat, thereby causing not only a problem that the reliability of the diagnostic evaluation is lowered, but also a problem that the reliability of the diagnostic evaluation is varied depending on the thermal image analyst's degree of knowledge about the diagnostic target when analyzing the thermal images.

DISCLOSURE

Technical Problem

An aspect of the disclosure is to provide a method of determining heat and reflected heat in a thermal image, in which artificial intelligence is used to analyze a thermal image of a subject to be diagnosed, and the heat and the reflected heat are detected and displayed based on the analysis.

Technical Solution

According to an embodiment of the disclosure, a method of determining heat and reflected heat in a thermal image includes: a) photographing a subject through a thermal imaging camera, and collecting a thermal image of the subject; b) analyzing features based on thermal image temperature distribution of the thermal image; c) detecting the heat and the reflected heat in the thermal image based on analysis in step b); and d) displaying the heat and the reflected heat in the thermal image, detected in step c), as heat and reflected-heat regions in the thermal image.

Step a) may include generating moving image data of the subject through the thermal imaging camera, and extracting and collecting the thermal image for each frame from the generated moving image data.

Step b) may include: (i) extracting a region-of-interest of the thermal image through machine learning based on an object extraction neural network; (ii) extracting raw data for each pixel of the region-of-interest; and (iii) extracting temperature data of the region-of-interest, and separately managing or filing the extracted temperature data.

The temperature data extracted from the region-of-interest may be cleansed, the region-of-interest is searched for low-heat distribution regions in units of pixels, and the found low-heat distribution regions may be excluded from the region-of-interest.

Heat distributions having similar features in the region-of-interest may be clustered, and clusters smaller than a certain reference size may be excepted.

Step c) may include detecting heat spots, which have a value greater than or equal to a certain threshold in the region-of-interest, in units of pixels.

Step c) may include analyzing variance in temperature between a pixel to be analyzed in the region-of-interest and surrounding pixels to determine reflected-heat spots corresponding to the pixels between which the variance in temperature is greater than or equal to a preset threshold.

Other details of the embodiments are included in the detailed description and the accompanying drawings.

Advantageous Effects

According to the disclosure, a method of determining heat and reflected heat in a thermal image has effects as follows.

First, the artificial intelligence is used to analyze the temperature distribution in the thermal image of the subject, captured and collected by thermal imaging camera, in the field of thermal image diagnostic evaluation, and detect and display the heat and the reflected heat of the analyzed thermal image, thereby improving the accuracy and reliability of the thermal image diagnostic evaluation.

Second, not only the reliability and the accuracy are improved by minimizing a diagnostic error in real-time thermal monitoring technology through the algorithm for discriminating between the heat and the reflected heat of the region-of-interest in the thermal image, but also a work/operation efficiency for a related worker/operator is improved through the heat and the reflected heat visually displayed in the thermal image.

MODE FOR INVENTION

Below, a method for determining heat and reflected heat in a thermal image according to an embodiment of the disclosure will be described in detail with reference to the accompanying drawings.

Prior to description, a method for determining heat and reflected heat in a thermal image according to an embodiment of the disclosure will be described limiting a subject to the facilities of a power plant using thermal energy, but it should be clarified in advance that the subject is not limited to the facilities of the power plant and may be applicable to the facilities in various industrial fields using the thermal energy.

Figure 1:
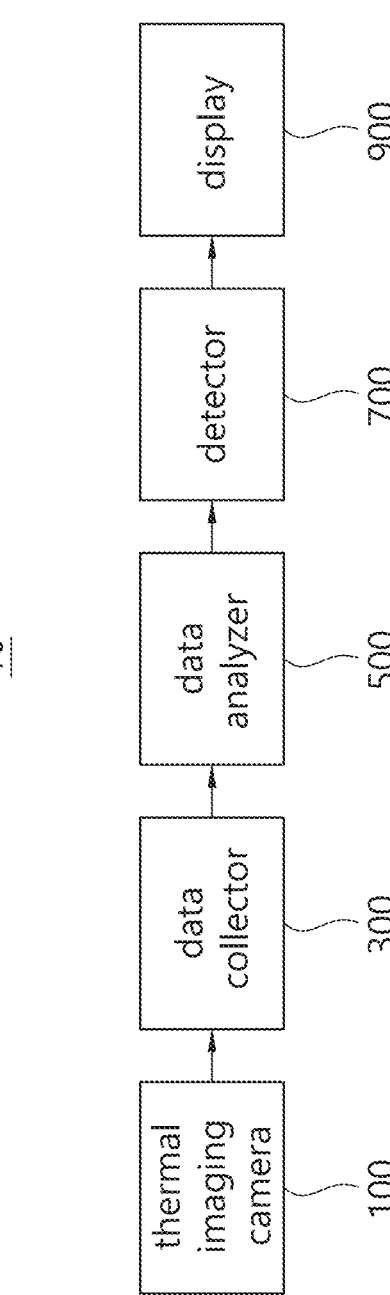
FIG. 1 is a schematic configuration diagram of a system for determining heat and reflected heat in a thermal image according to an embodiment of the disclosure.
Figure 2:
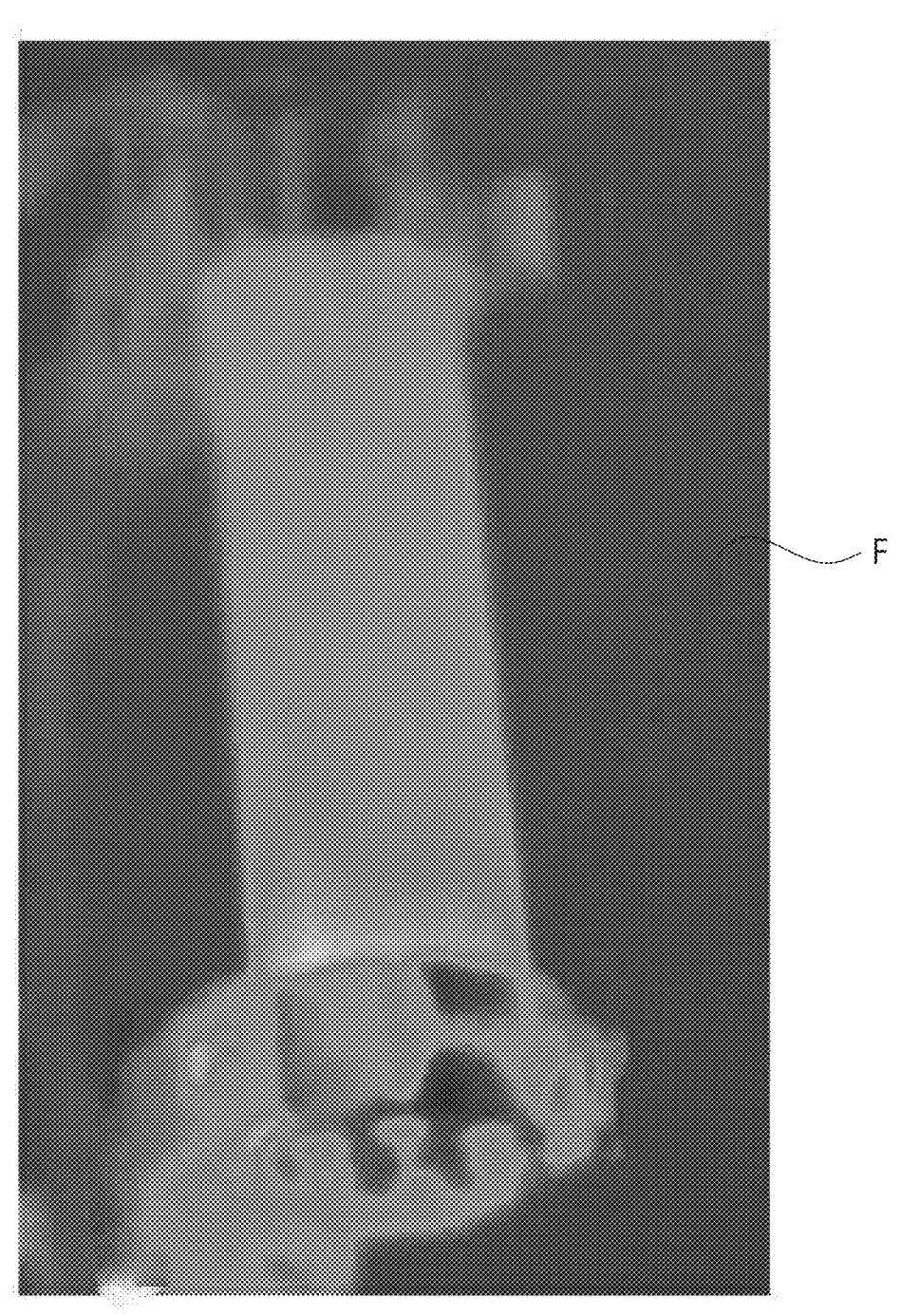
FIG. 2 shows an example of a thermal image collected by a method of determining heat and reflected heat in a thermal image according to an embodiment of the disclosure.
Figure 3:
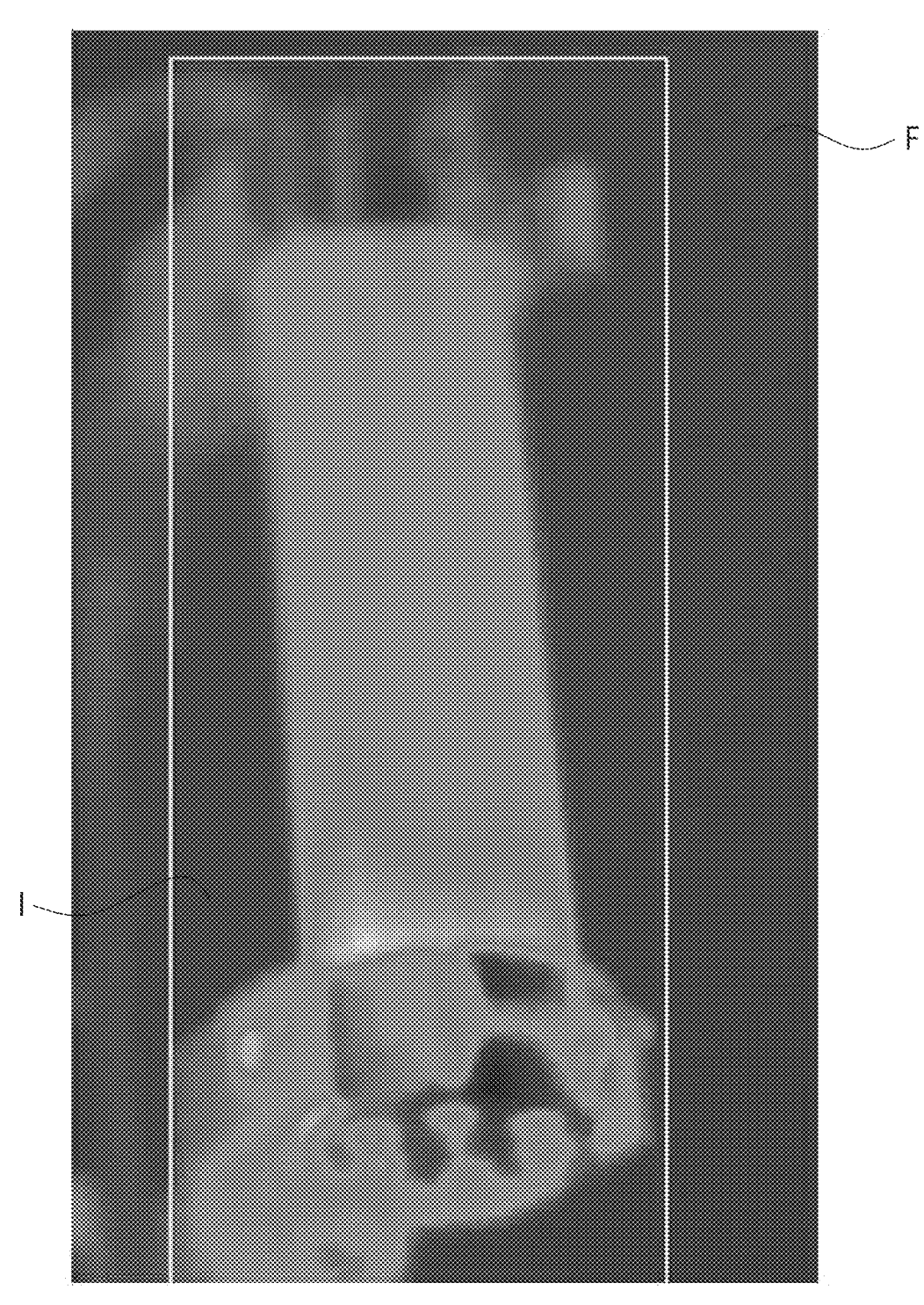
FIG. 3 shows an example of extracting a region-of-interest in the thermal image shown in FIG. 2.
Figure 4:
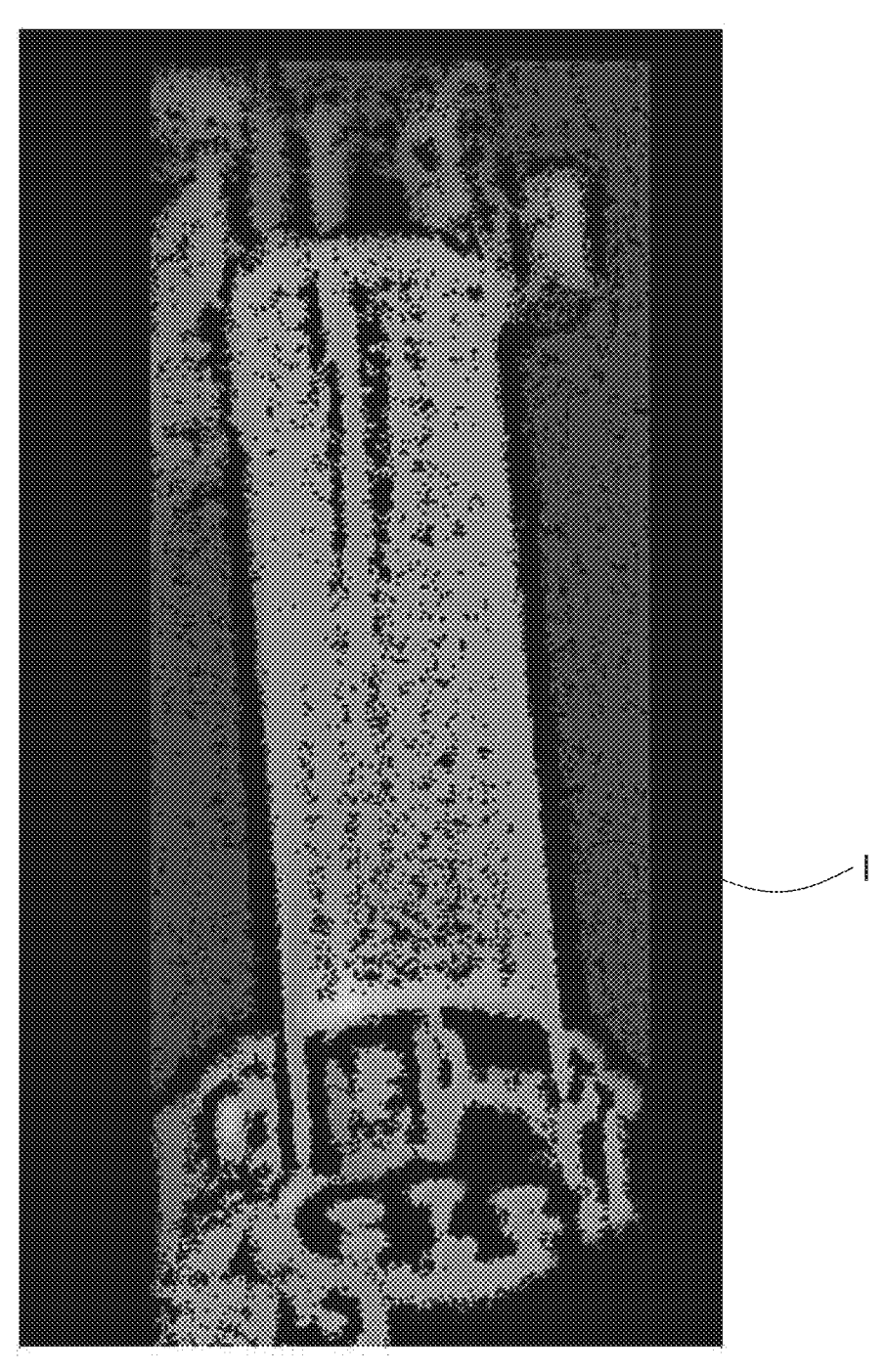
FIG. 4 shows an example of extracting a region-of-interest in the thermal image shown in FIG. 3.

FIG. 1 is a schematic configuration diagram of a system for determining heat and reflected heat in a thermal image according to an embodiment of the disclosure, FIG. 2 shows an example of a thermal image collected by a method of determining heat and reflected heat in a thermal image according to an embodiment of the disclosure, FIG. 3 shows an example of extracting a region-of-interest in the thermal image shown in FIG. 2, and FIG. 4 shows an example of extracting a region-of-interest in the thermal image shown in FIG. 3.

As shown in FIGS. 1 to 4, a system 10 for determining heat and reflected heat in a thermal image according to an embodiment of the disclosure includes a thermal imaging camera 100, a data collector 300, a data analyzer 500, a detector 700, and a display 900. The system 10 for determining heat and reflected heat in a thermal image according to an embodiment of the disclosure discriminates between the heat and the reflected heat in a subject based on the facilities of a power plant.

As shown in FIG. 2, the thermal imaging camera 100 photographs a subject. Here, the subject photographed by the thermal imaging camera 100 includes the facilities, pipework, etc. of the power plant. The thermal imaging camera 100 photographs the subject such as the facilities, pipework, etc. of the power plant. The thermal imaging camera 100 captures a thermal image F of a subject as a moving-image file. The moving-image file captured by the thermal imaging camera 100 is extracted as the thermal images F in units of still-image frames. In this way, the thermal imaging camera 100 captures the moving-image file of the subject, and the captured moving-image file is extracted as the thermal images F in units of still-image frames, thereby preventing a lack of training data when the data analyzer 500 is trained with the training data.

Specifically, the thermal imaging camera 100 captures the moving image at 30 frames per second, and the moving image captured by the thermal imaging camera 100 is cut for each frame to be generated as the training data. According to an embodiment of the disclosure, when the moving image captured at 30 frames per second is generated as the training data for each frame, the moving-image file corresponding to about 1 minute is generated as 1,800 pieces of training data.

The data collector 300 collects the training data based on the thermal image F captured by the thermal imaging camera 100. The data collector 300 collects the thermal image F in units of still-image frames extracted from the moving-image file, with which the data analyzer 500 can be trained through machine learning based on an object extraction neural network.

The data analyzer 500 analyzes the training data of the thermal image F acquired by the data collector 300. In detail, as shown in FIGS. 3 and 4, the data analyzer 500 extracts a region-of-interest (I) of the thermal image F through the machine learning based on the object extraction neural network, extracts raw data for each pixel of the region-of-interest (I), extracts temperature data of the region-of-interest (I), and separately manage or file the extracted temperature data. Here, according to an embodiment of the disclosure, the machine learning based on the object extraction neural network used in the data analyzer 500 employs a deep learning-based object detection algorithm. According to an embodiment of the disclosure, the deep learning-based object detection algorithm uses a Faster R-CNN algorithm, but is not limited thereto. Alternatively, various deep learning-based object detection algorithm may be used.

The data analyzer 500 extracts the region-of-interest (I) of the thermal image F through the machine learning based on the object extraction neural network, and cleanse the temperature data extracted from the region-of-interest (I). After cleansing the temperature data extracted from the region-of-interest (I), the data analyzer 500 searches the region-of-interest (I) for low-heat distribution regions in units of pixels, and excludes the found low-heat distribution regions from the region-of-interest (I).

Here, the cleansing of the temperature data extracted from the region-of-interest (I) may improve the speed and accuracy of analyzing the features of the thermal image F. After searching the region-of-interest (I) for the low-heat distribution regions in units of pixels and excluding the found low-heat distribution regions from the region-of-interest (I), the heat distributions of similar features in the region-of-interest (I) are clustered, and clusters smaller than a certain reference size are excepted. Specifically, a smaller cluster has a higher possibility of measurement error while analyzing the features of the thermal image F, and thus an exception processing algorithm is used so that the clusters smaller than the certain reference size can be excepted from the analysis, thereby improving a determination accuracy for the thermal image F.

Next, the detector 700 detects the heat and the reflected heat in the thermal image F based on the analysis of the captured thermal image F. In detail, the detector 700 detects heat spots, which have a value greater than or equal to a certain threshold in the region-of-interest (I), in units of pixels, and analyzes variance in temperature between a pixel to be analyzed in the region-of-interest (I) and surrounding pixels to determine the reflected-heat spots corresponding to the pixels between which the variance in temperature is greater than or equal to a preset threshold. For example, the top n % heat spots having the values greater than or equal to the certain threshold in the region-of-interest (I) are detected in units of pixels. According to an embodiment of the disclosure, the top 5% heat spots may be detected in units of pixels. Of course, the top 5% of the heat spots to be detected in units of pixels is merely an example, and the top n % may be changed by design modification.

Last, the display 900 displays the heat and reflected heat regions in the thermal image F based on the heat and reflected heat detected by the detector 700. The display 900 generates a comparison image for the thermal image F, and displays the heat and the reflected heat in the original thermal image F. Here, according to an embodiment of the disclosure, the detector 700 and the display 900 are separated, but may be integrated as a single body.

Figure 5:
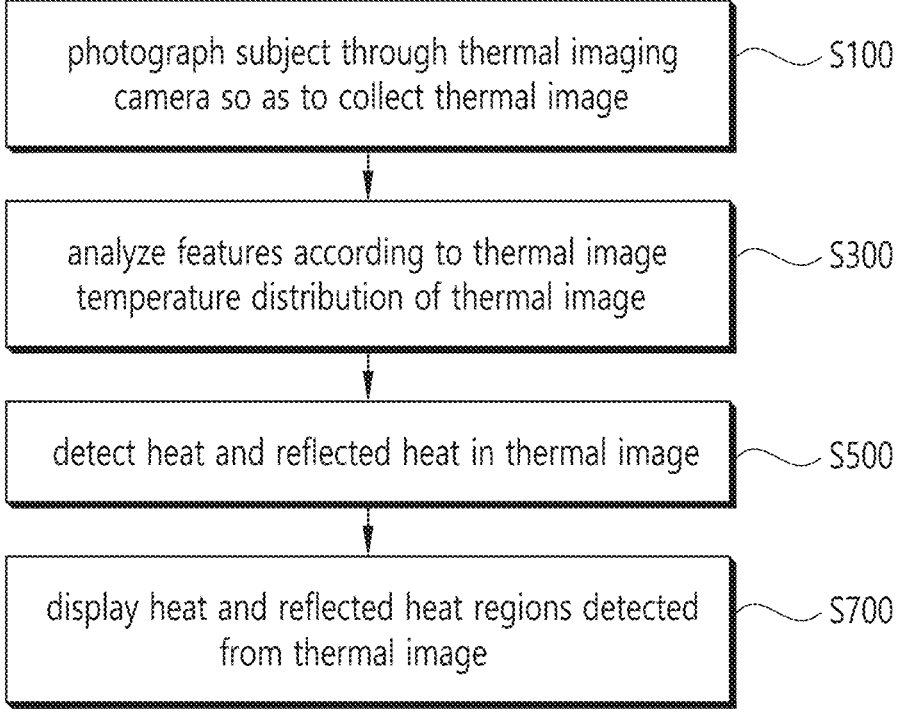
FIG. 5 is an operational flowchart of a method for determining heat and reflected heat in a thermal image according to an embodiment of the disclosure.

FIG. 5 is an operational flowchart of a method for determining heat and reflected heat in a thermal image according to an embodiment of the disclosure.

According to an embodiment of the disclosure, a method of discriminating between the heat and the reflected heat in the thermal image F is as follows.

First, the thermal image F of the subject is collected by photographing the subject through the thermal imaging camera 100 (S100). The thermal imaging camera 100 captures the moving image of the subject such as the facilities of the power plant, and the moving-image file of the subject photographed by the thermal imaging camera 100 is extracted as the thermal images F in units of still-image frames. In this way. the moving-image file captured by the thermal imaging camera 100 is extracted as the thermal images F in units of still-image frames and acquired as the training data, thereby preventing a lack of the training data necessary for the machine learning based on the object extraction neural network when the features of the thermal image F are analyzed.

The features of the thermal image F based on temperature distribution are analyzed (S300). Here, in step S300, the region-of-interest (I) of the thermal image F is extracted through the machine learning based on the object extraction neural network, and the raw data for each pixel of the region-of-interest (I) is extracted. In addition, in step S300, the temperature data of the region-of-interest (I) is extracted, and the extracted temperature data is separately managed and filed. In detail, in step S300, the temperature data extracted from the region-of-interest (I) is cleansed, the region-of-interest (I) is searched for the low-heat distribution regions in units of pixels, and the found low-heat distribution regions are excluded from the region-of-interest (I). Further, in S300, the heat distributions having similar features in the region-of-interest (I) are clustered, and clusters smaller than a certain reference size are excepted. In this way, the temperature data extracted from the region-of-interest (I) is cleansed to exclude the pixels of the low-heat distribution and exclude the heat distribution clusters smaller than the certain reference size, thereby limiting the occurrence of errors when detecting the heat and the reflected heat in the thermal image F, and improving the accuracy and reliability of discriminating between the heat and the reflected heat of the thermal image F.

The heat and the reflected heat are detected in the thermal image F (S500). In step S500, the heat spots, which have a value greater than or equal to a certain threshold in the region-of-interest (I), are detected in units of pixels. Further, in step S500, variance in temperature between a pixel to be analyzed in the region-of-interest (I) and surrounding pixels is analyzed to determine the reflected-heat spots corresponding to the pixels between which the variance in temperature is greater than or equal to a preset threshold. Specifically, in step S500, the top n % heat spots having the values greater than or equal to the certain threshold in the region-of-interest (I) are detected in units of pixels. As described above, according to an embodiment of the disclosure, the top 5% heat spots are described as the top n % heat spots. However, this embodiment is merely an example, and n % may be changed by design modification. The detected heat and reflected-heat regions are displayed on the thermal image F (S700). In step S700, the heat and the reflected heat detected in the thermal image F in step S500 are displayed as the heat and the reflected heat regions in the thermal image F. Specifically, in step S700, a comparison image for the thermal image F is generated and the heat and the reflected heat are displayed on the original thermal image F.

Thus, the artificial intelligence is used to analyze the temperature distribution in the thermal image of the subject, captured and collected by thermal imaging camera, in the field of thermal image diagnostic evaluation, and detect and display the heat and the reflected heat of the analyzed thermal image, thereby improving the accuracy and reliability of the thermal image diagnostic evaluation.

Further, not only the reliability and the accuracy are improved by minimizing a diagnostic error in real-time thermal monitoring technology through the algorithm for discriminating between the heat and the reflected heat of the region-of-interest in the thermal image, but also a work/operation efficiency for a related worker/operator is improved through the heat and the reflected heat visually displayed in the thermal image.

Although a few embodiments of the disclosure have been described with reference to the accompanying drawings, a person having ordinary knowledge in the art to which the disclosure pertains can understood that the disclosure may be embodied in other specific forms without changing technical spirit or essential features. Accordingly, the embodiments described above are illustrative and not restrictive in all aspects. The scope of the disclosure is defined by the appended claims rather than the foregoing detailed description, and all changes or modifications derived from the meaning and scope of the appended claims and their equivalents are construed as falling within the scope of the disclosure.

The invention claimed is:

1. A method of determining heat and reflected heat in a thermal image, the method comprising:
   a) photographing a subject through a thermal imaging camera, and collecting a thermal image of the subject;
   b) analyzing features based on a thermal image temperature distribution of the thermal image;
   c) detecting heat and reflected heat in the thermal image based on the analysis in step b); and
   d) displaying the heat and the reflected heat in the thermal image, detected in step c), as heat and reflected-heat regions in the thermal image,
   wherein the step b) comprises:
   (i) extracting a region-of-interest of the thermal image through machine learning based on an object extraction neural network;
   (ii) extracting raw data for each pixel of the region-of-interest; and iii) extracting temperature data of the region-of-interest, and separately managing or filing the extracted temperature data, wherein the step c) comprises analyzing variance in temperature between a pixel to be analyzed in the region-of-interest and surrounding pixels to determine reflected-heat spots corresponding to the pixels between which the variance in temperature is greater than or equal to a preset threshold.

2. The method of claim 1, wherein the step a) comprises generating moving image data of the subject through the thermal imaging camera, and extracting and collecting the thermal image for each frame from the generated moving image data.

3. The method of claim 1, wherein the temperature data extracted from the region-of-interest is cleansed, the region-of-interest is searched for low-heat distribution regions in units of pixels, and the found low-heat distribution regions are excluded from the region-of-interest.

4. The method of claim 1, wherein heat distributions having similar features in the region-of-interest are clustered, and clusters smaller than a certain reference size are excepted.

5. The method of claim 1 wherein the step c) comprises detecting heat spots, which have a value greater than or equal to a certain threshold in the region-of-interest, in units of pixels.

* * * * *